United States Patent [19]

Stambaugh et al.

[11] Patent Number: 4,757,504
[45] Date of Patent: Jul. 12, 1988

[54] POLYPHASE PARITY GENERATOR CIRCUIT

[75] Inventors: Mark A. Stambaugh, Missouri City; Stephen P. Sacarisen, Richardson, both of Tex.

[73] Assignee: Texas Instruments Incorporated

[21] Appl. No.: 854,449

[22] Filed: Apr. 21, 1986

[51] Int. Cl.[4] .............................................. G06F 11/10
[52] U.S. Cl. .................................................... 371/49
[58] Field of Search ........................ 371/49; 307/471; 364/200 MS File, 900 MS File, 738

[56] References Cited

U.S. PATENT DOCUMENTS

| | | | |
|---|---|---|---|
| 3,784,976 | 1/1974 | Ho | 371/49 |
| 4,451,922 | 5/1984 | Dearden | 371/49 |
| 4,538,271 | 8/1985 | Kohs | 371/49 |

OTHER PUBLICATIONS

F. F. Sellers, "Error Detecting Logic For Digital Computers", 1968, pp. 59–62.

Primary Examiner—Jerry Smith
Assistant Examiner—Robert W. Beausoliel
Attorney, Agent, or Firm—Melvin Sharp; John G. Graham; Rodney M. Anderson

[57] ABSTRACT

A polyphase parity generator circuit for generating parity of multiple bit data values on a data bus during one or more phases of a bus cycle. The circuit includes a prestage circuit having a plurality of parallel decode circuits couplable to respective pairs of input data lines. Each decode circuit has an odd and even output line for providing output signals in response to odd or even number of 1's (or 0's) on an associated pair of row lines, respectively. The circuit includes a precharge discharge circuit coupled to the prestage circuit for generating a first parity signal in response to an odd number of 1's being on the input data lines and a second parity signal in response to an even number of 1's being on the input data lines.

12 Claims, 3 Drawing Sheets

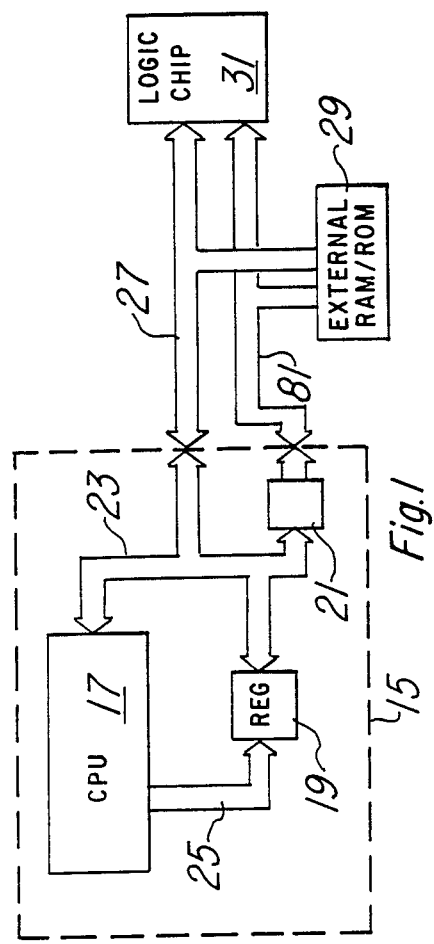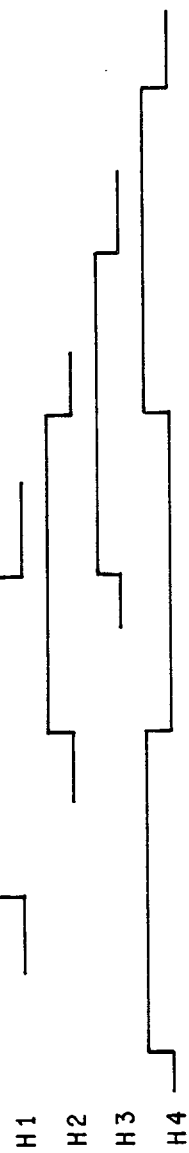
Fig.1
Fig.3
Fig.4

POLYPHASE PARITY GENERATOR CIRCUIT

BACKGROUND OF THE INVENTION

The present invention relates to a circuit for generating and checking parity of data words in a multiple bit system.

Often in complex circuitry there is a complex bus timing that demands the generation of parity from different circuits and at different times in the bus cycle. A parity checker may also be required to generate parity at yet another time in a cycle so that the value generated can be compared to an already existing parity. The use of three or more circuits to accomplish the above would ordinarily comsume too much power and use too much silicon area in the case where VLSI applications are involved. Moreover, totally static or totally precharge/discharge generators would simply not meet the speed requirements of present day bus cycles.

Accordingly, an object of the present invention is to provide an improved parity generator/checker circuit. More particularly, it is an object of the present invention to provide a parity generator/checker circuit capable of both checking and generating parity at different times in a bus cycle.

SUMMARY OF THE INVENTION

According to the invention there is provided a polyphase parity generator circuit for generating parity of multiple bit data values on a data bus during one or more phases of a bus cycle. The circuit includes a precharge/discharge circuit for generating a first parity signal level in response to an odd number of 1's being on odd and even input data lines and a second parity signal level in response to an even number of 1's being on the odd and even input data lines.

The circuit may include a prestage circuit having a plurality of parallel decode circuits couplable to respective pairs of prestage input data lines. Each decode circuit has an odd and even output line couplable to odd and even P/D input data lines for providing output signals in response to odd or even number of 1's (or 0's) on an associated pair of prestage input lines, respectively. A parity checker may be included in the generator circuit which is coupled to the precharge/discharge circuit for checking the parity of an externally supplied byte, or of a byte stored in internal RAM. The parity checker circuit may further include a multiple path circuit having a plurality of intermediate nodes and connecting paths therebetween, a discharge node and a test node. Each path is controlled by selected pass gates gated by signals on respective even and odd output lines, a discharge circuit coupled to the discharge node for discharging the latter in response to discharge control signals, and a parity output circuit coupled to the test node for generating a parity bit in response to the signal level on the test node and for receiving and temporarily storing an externally generated parity bit.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

FIG. 1 is a block diagram of a typical system in which a parity generator/checker is used;

FIG. 3 is a legend showing the equivalence of a symbol used for a pass transistor to the usual symbol used for that device.

FIG. 4 is a timing diagram of the inputs to the circuit of FIG. 2.

DETAILED DESCRIPTION WITH REFERENCE TO THE DRAWINGS

Figure 2A:
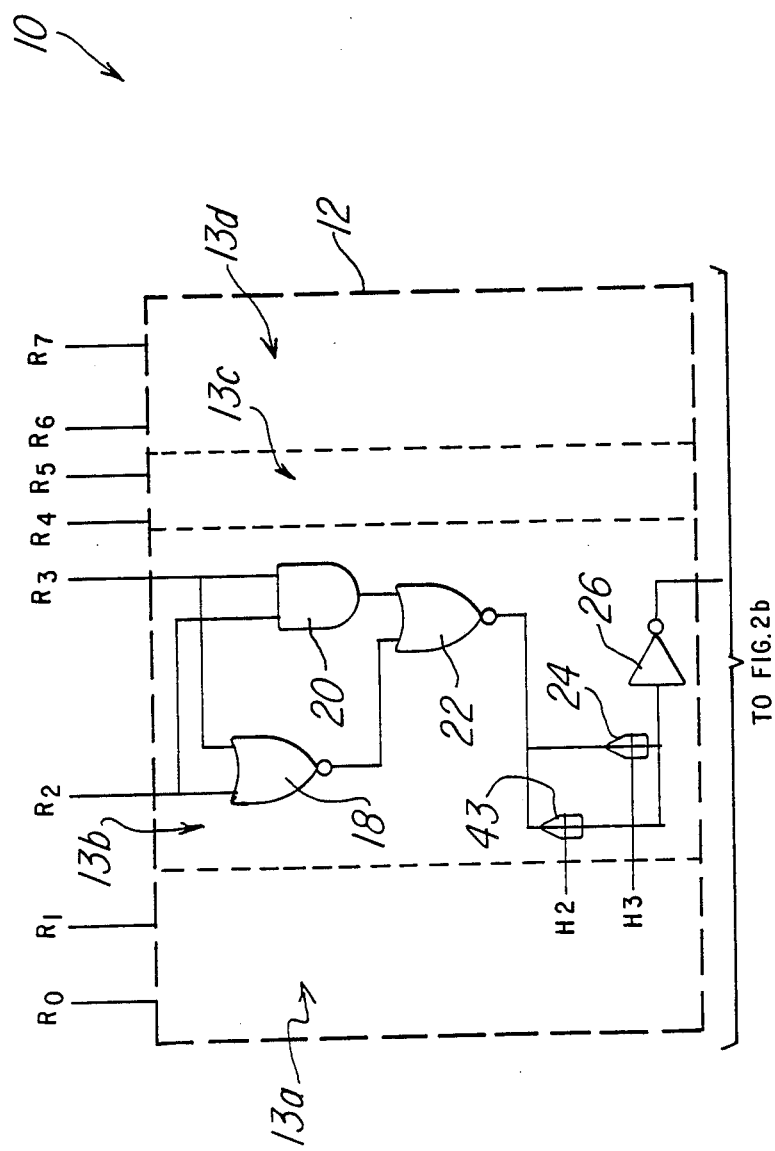
FIG. 2 is a circuit diagram of a preferred embodiment of a parity generator/checker circuit according to the invention.

Referring to FIG. 1 a typical system which incorporates the invention includes a central processor (CP) 15 inside of which is a central processing unit (CPU) 17, a register 19 and a parity generator/checker 21. The CPU 17 is coupled to the register 19, to the parity generator/checker 21 and to an external date bus 27 by an internal data bus 23. The CPU is also coupled to the bit locations of the register 19 by coupling lines 25 which allow the CPU to alter any bit of the register 19 at any time without transmitting data on the internal bus 23. An optional number of external logic chips 31 can be coupled to the CP 15 by the external data bus 27. Parity bits are transferred between units 15, 29 and 31 along parity bus 81.

Data may be transmitted onto the external data bus 27 along with parity onto the external parity bus 81 by the logic chip 31 and sent to CP 15 where it enters onto the internal data bus 23 and is examined by the parity generator/checker 21 to ensure that its parity is correct. Concurrently, the data may be stored on the register 19. Alternatively, data may be sent from the CPU along the internal data bus 23, a parity bit generated by the parity generator/checker 21 and the data and parity bit sent along the external data bus 27 and parity bus 81, respectively, to the logic chip 31 or external memory 29.

Figure 2B:
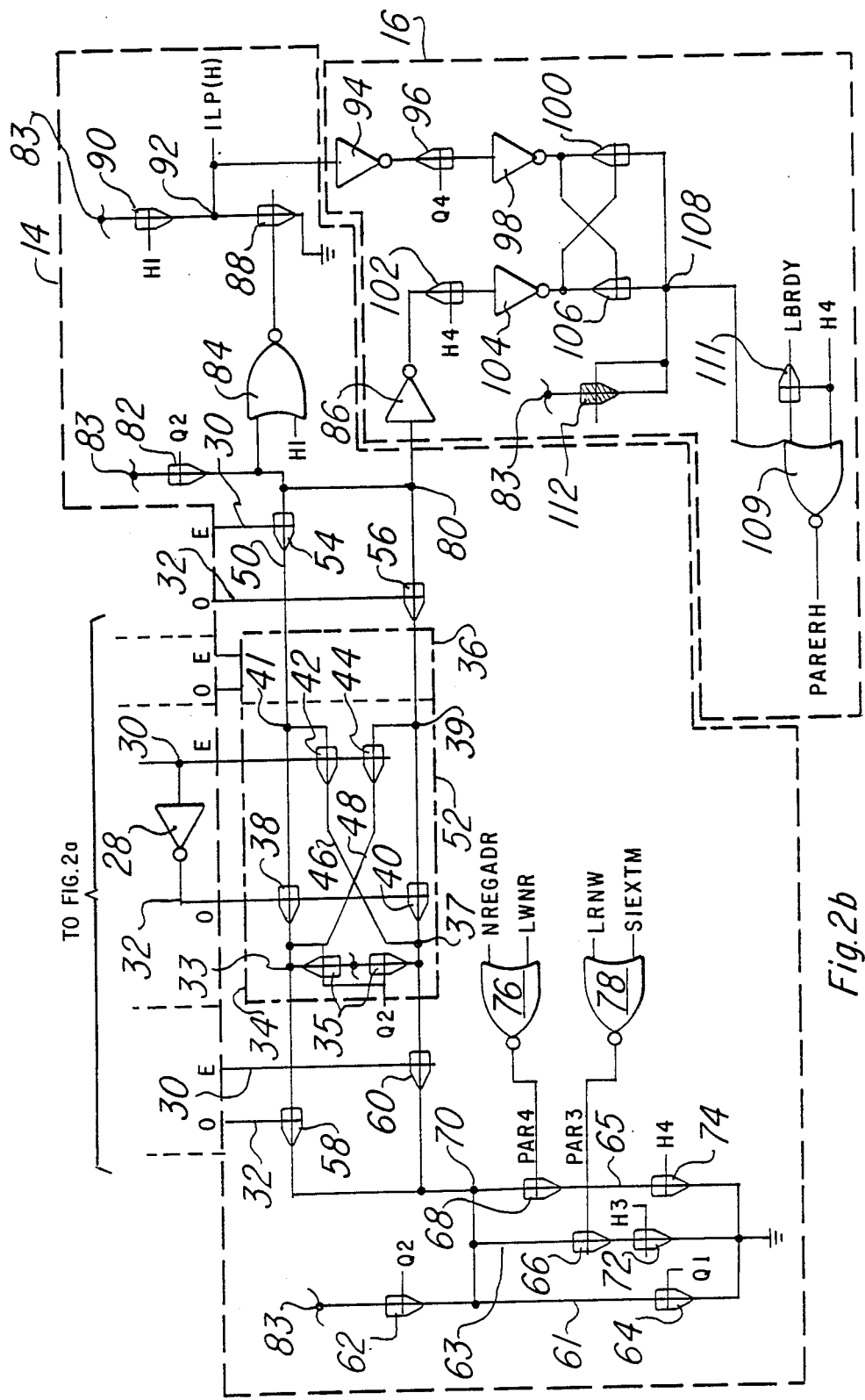

Referring to FIG. 2, the parity generator/checker 10 consists of a prestage assembly 12 made up of four exclusive or circuits 13a, 13b, 13c, and 13d each having a pair of data lines as inputs. Each XOR circuit 13a, 13b, 13c, and 13d consists of a NOR gate 18 and AND gate 20 sharing a pair of lines as inputs. A second NOR gate 22 has as its two inputs the outputs of NOR gate 18 and AND gate 20. The combination of NOR gates 18 and 22 and AND gate 20 form an exclusive or (XOR) circuit. Pass transistors 43 and 24 are coupled to the output of NOR gate 22 and to the input of inverter 26. Node 30 being at the output of inverter 26 carries the exclusive nor (XNOR) of the pair of inputs to the prestage and is high if the data inputs have either two "0"'s or two "1"'s and corresponds to an even output. Inverter 28 inverts the signal on node 30 thereby producing an exclusive or of the pair of input data lines. The signal on node 32 is high when only one of the pair of input data lines is high and corresponds to an odd output.

In each block 36 and 34 of a precharge/discharge 4 bit parity generator 14 there is a network of pass transistors 38, 40, 42, and 44 controlling lines 50, 52, 46 and 48, respectively, and controlling charge flow from node 41 to node 33, from node 39 to 37, from node 41 to node 37, and from node 39 to node 33, respectively. In each block 34 and 36 line 46 couples to line 50 at node 41 and to line 52 at node 37 while line 48 couples to line 52 at node 39 and to line 50 at node 33. Pass gates or transistors 54 and 56 couple node 80 to nodes 41 and 39, respectively, of block 36 and are turned on by a true signal on even and odd outputs of prestage 13d, respectively, while pass transistors 58 and 60 couple nodes 33 and 37 of block 34, respectively, to node 70 and are turned on by true outputs from odd and even outputs of prestage 13a.

Lines 50 and 52 join at node 70 which is precharged in phase Q2 (see FIG. 4) by Vcc source 83 through pass gate 62. Discharge of node 70 can occur through any one of lines 61, 63 or 65. Line 61 is controlled by pass gate 64, line 63 by pass gates 66 and 72 and line 65 by pass gates 68 and 74. Pass gate 66 is controlled by NOR gate 78 whose two inputs are LRNW corresponding to a "read not write" input and SIEXTM corresponding to the data bus being under the control of an external master (i.e. an external chip such as logic chip 31). Thus, when the register 19 is being read LRNW is high and when data is being written by the CPU 17 then the latter signal is low. When another central processor is controlling the external bus, SIEXTM is high and when the local CPU controls the external bus SIEXTM is low.

Pass gate 68 is controlled by NOR gate 76 whose two inputs are LWNR (local write not read) (the inverse of LRNW) and NREGADR corresponding to the negative of addressing the internal register. Thus, when NREGADR is low, indicating the internal register is being addressed, and LWNR is low, indicating that the read mode is active, a positive PAR4 output turns on pass gate 68. The high PAR4 output corresponds to a read of the internal register being effected.

At the opposite end of the network of pass transistors 54, 56, 38, 40, 42, 44, 58 and 60 there is formed a node 80 which is precharged on a second phase Q2 of the bus cycle by a pass gate 82 from Vcc source 83. Node 80 forms an input to a NOR gate 84 which is disabled by a signal H1 applied to its other input. Node 80 is also applied to the input of an inverter 86 whose output goes through a pass gate 102 triggered on by a clock signal H4 to an input of a second inverter 104.

NOR gate 84 controls discharge of an ILP(H) node 92 through pass gate 88 which is connected to ground. Gate 84 is forced low during the time H1 disabling pass gate 88. Node 92 is precharged to Vcc source 83 through pass gate 90 during the time H1 is high. Node 92 carries the parity value ILP(H). The latter value also passes through inverter 94, pass gate 96 gated by Q4 and inverter 98. The output of inverter 98 is blocked by pass gate 100 which is coupled to node 108 and is controlled by the output of inverter 104. Similarly, the output of inverter 104 passes through pass gate 106 when the latter is turned on by a high signal level on the output of inverter 98. Pass gate 106 is also coupled to node 108. Node 108 forms one of three inputs to a parity error NOR gate 109. The other inputs to the latter are H4 and LBRDY through pass gate 111 also controlled by H4. When H4 is high everything is blocked so that PARERH, which is maintained at the input of NOR state 109 when H4 is off can be valid only during Q2 and Q3 since H4 extends over Q4 and Q1 as shown in FIG. 4. LBRDY extends that state of the system over a complete clock cycle (i.e. from Q3 to Q3 of a next bus cycle) and corresponds to an extended cycle with parity checking deferred.

Node 108 is charged through depletion transistor 112 from Vcc source 83 to Vcc potential and goes low only if the value on node 92 is different than the value on node 80. The latter condition corresponds to a parity error and results in a PARERH signal from NOR gate 109. A discharge of node 80 can take place only if the data lines $R_0, R_1, \ldots, R_7$ have an odd number of "1"'s and one of paths 61, 63 or 65 is conductive to ground. During Q4 the value of ILP(H) as conditioned by NOR gate 84 or driven from the external bus 83 (see FIG. 1) is transferred to inverter 98. If ILP(H) and node 80 are both low node 108 will be high and if IPL(H) is high the voltage on node 108 will be determined by the output from inverters 104 and 86. A low value at node 80 causes a low at the output of inverter 104 and hence at node 108 if the output of inverter 98 is high. At the end of Q4, ILP(H) at node 92 charges through pass gate 90 while pass gate 96 closes retaining the value of ILP(H) of the last cycle at the output of inverter 98.

During Q1 transistor 64 conducts discharging node 70 and node 80 if there are an odd number of 1's on the data lines $R_0, R_1, \ldots, R_7$. NOR gate 84 is disabled by H1 and node 92 charges from Vcc source 83 through pass gate 90. The last value of ILP(H) is on the output of inverter 98. In the case that ILP(H) was 1 and the value on node 80 is 1 corresponding to an even number of 1's on that data lines then output of inverter 104 is 1 and that of inverter 98 is also 1 so that node 108 remains 1. In the case ILP(H) was 1 and the value on node 80 is 0 corresponding to an odd number of 1's on the data lines then the output of inverter 104 is 0 and node 108 is drawn down low giving rise to an output PARERH of 1 indicating a parity error. Similarly, a last value of ILP(H) of 0 and a value of 1 on node 80 also results in node 108 being drawn low (this time by inverter 98) and a PARERH of 1 resulting.

During Q2 clock signal H2 turns on pass gate 43 allowing the exclusive or circuits to conduct through inverters 26 and 28 and enable the data lines $R_0, R_1, \ldots, R_7$ to change the values of the odd and even outputs "O" and "E", respectively, depending on the signal levels of the data lines. At the same time Q2 turns on transistors 62, 35 and 82 to precharge nodes 70, 37 33, 39, 41 and 80. Shortly after the start of Q2, a low LRNW signal is received together with a low SIEXTM signal signifying that a CPU write mode is to be entered resulting in a PAR3 output going high. The internal data bus is validated shortly before the end of Q2 by the CPU.

At the start of Q3, clock signal H3 turns on pass gate 72 which allows node 70 to discharge to ground. At the same time H3 turns on transistor 24 so that both pass gates 43 and 24 conduct connecting the exclusive or gates to the odd 32 and even 30 output lines. Parallelling pass gate 43 and 24 simply allows the odd and even data lines 32 and 30 to reflect the state of the internal data lines at all times except during Q1 when the lines $R_0, R_1, \ldots R_7$ become invalid and the odd and even lines maintain old values. If the number of 1's in the data lines is odd then node 80 will be discharged to ground. This will result in NOR gate 84 turning on pass gate 88 and discharging node 92 to ground placing a 0 on parity line ILP(H). The data thus gets transmitted from the internal data bus onto the external data bus commencing toward the end of Q3.

At the start of Q4 transistors 96 and 102 are turned on by Q4 and H4, respectively, and NOR gate 109 is disabled by H4. Thus, a 0 is outputted by inverter 98 as well as by inverter 104 and pass gate 100 and 106 are off causing the voltage at node 108 to increase and PARERH to go down and indicating no parity error.

In the event that LWNR and NREGADR are both low corresponding to a read of internal data in the register 19, a high PAR4 output is developed. The data is first placed on the internal data bus and then parity is generated during Q4 with the value of the parity bit driven onto node 92 through NOR gate 84 and pass gate 88. The generated parity bit is passed through pass gate 96. At that start of Q4 node 70 is grounded through pass gates 68 and 74. In the case of an odd number of 1's on the date lines $R_0, R_1, \ldots, R_7$, node 80 is drawn low thereby placing an 0 on ILP(H) node 92. If the value placed on node 92 during Q4 was low both gates 100 and 106 will be off indicating 0 is the correct parity bit of the 8 bit number on the data lines. Otherwise an interrupt signal PARERH on NOR gate 109 will be developed. This data together with its parity bit is then transmitted on to the external data and parity buses, respectively.

If neither PAR4 nor PAR3 go high then the central processor 15 is neither having its register read, nor is it writing data. Under these conditions pass transistor 64 turns on the discharge path 61 during Q1 to check the parity that existed on the bus at the end of Q4. Pass gates 43 and 24 sample the data bus on the end of Q4 so that parity can be checked during Q1. It is the values stored on the input of inverter 26 by the falling edge of H3 at the end of Q4 by the opening of pass gate 24 that is compared to the parity stored on inverter 98 on the falling edge of Q4 by the opening of pass gate 96.

An optimum compromise between speed and power consumption is achieved in the design in FIG. 2. It would be possible to use two static prestages but the power consumption would be too high. It would also be possible to use an 8 transistor chain in any path circuit but such a circuit would be of the order of 4 times slower than the 4 transistor circuit shown in FIG. 2.

In the event a 16 bit system is to be used, two separate circuits 10 can be used, one for the lowest byte or 8 bits would be other for the highest 8 bits. Two separate parity bits would be used in such a case rather than just one and the interrupt signal PARER for each byte could be fed into an OR gate.

While this invention has been described with reference to an illustrative embodiment, this description is not intended to be construed in a limiting sense. Various modifications of the illustrative embodiment, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A polyphase parity generator circuit for generating parity of multiple bit data values on a data bus during one or more phases of a bus cycle, comprising:
    a prestage circuit having a plurality of parallel decode circuits each couplable to a pair of data lines of said data bus, each of said decode circuits having an odd and an even prestage output line, each of said decode circuits for providing an output signal on its odd line if the number of 1's on its pair of data lines is odd and an output signal on its even line otherwise; and
    a precharge/discharge circuit having a plurality of odd and even input lines connected to the odd and even prestage output lines from said decode circuits, respectively, for generating at its output a first parity signal level in response to an odd number of 1's being on its odd and even input lines and a second parity signal level in response to an even number of 1's being on the odd and even input lines; and
    a parity checker circuit for checking a parity bit supplied with the multiple bit data values on said data bus against the output of said precharge/discharge circuit.

2. A ployphase parity generator circuit according to claim 1, wherein said parity checker circuit includes a multiple path circuit having a plurality of intermediate nodes and connecting paths therebetween, a discharge node and a test node with each path controlled by selected pass gates gated by signals on respective even and odd output lines of said prestage circuit, a discharge circuit coupled to said discharge node for discharging the latter in response to discharge control signals, and a parity output circuit coupled to said test node for generating a parity bit in response to the signal level on said test node and for receiving and temporarily storing an externally generated parity bit.

3. A polyphase parity generator/checker circuit for generating and checking parity of multiple bit data values on a data bus during one or more phases of a bus cycle, comprising:
    a plurality of parallel decode circuits, each having a pair of input lines connected to a pair of data lines of said data bus, and each having an odd and even decode output line, for providing an output signal on its odd decode output line if the number 1's or 0's on the pair of input data lines is odd and an output signal on its even decode output line otherwise;
    a multiple path circuit having a plurality of intermediate nodes and connecting paths therebetween, a discharge node and a test node with each of said connecting paths controlled by pass gates gated by signals on respective even and odd decode output lines from one of said parallel decode circuits;
    a polyphase discharge circuit coupled between said discharge node and ground and having a plurality of separate discharge paths controlled by respective gates which are gated on selected bus cycle phases and in response to selected combinations of control signals;
    a precharge circuit coupled to said test node, said discharge node and to selected ones of said intermediate nodes for precharging said nodes; and
    a parity generator coupled to said test node and responsive to the voltage thereon to generate a parity value for a data word applied to said prestage circuit on predetermined phases of said bus cycle.

4. A circuit according to claim 3, including a parity checker circuit coupled to said precharge circuit and said parity generator for generating a parity error signal whenever the signal on said test node is not equal to the the signal on an output of said parity generator.

5. A circuit according to claim 3, wherein the number of input data lines is 8.

6. A circuit according to claim 5, wherein each of said decode circuits has a pair of inputs coupled to a corresponding pair of said input data lines and an odd and even output line coupled to corresponding odd and even pass gates of said multiple path circuit.

7. A circuit according to claim 6, wherein said decode circuits each include pass gates which open the associated inputs to said odd and even output liens during phases 2, 3, and 4 of a 4 phase bus clock sequence.

8. A circuit according to claim 3, wherein each path from test node to discharge node contains 4 pass gates.

9. A circuit according to claim 3, wherein said discharge circuit has three paths, a first path connecting said discharge node to ground during a first phase of said bus cycle to check parity, a second path connecting said discharge node to ground during a second phase of said bus cycle and only during a CPU write command, and a third path connecting said discharge node to ground during a third phase of said bus cycle and only during a read command for internal bytes stored without parity.

10. A circuit according to claim 9, wherein said parity checker circuit is active only during a first phase of said bus cycle to compare data and parity thereof present on the data bus at the end of a previous bus cycle.

11. A circuit according to claim 10, wherein a parity terminal at an output of said parity checker circuit is precharged to a high voltage level during a first phase of said bus cycle.

12. A circuit according to claim 11, wherein said parity circuit output is disabled during a fourth and first phase of said bus cycle.

* * * * *